US008065315B2

(12) United States Patent
Rapp et al.

(10) Patent No.: US 8,065,315 B2
(45) Date of Patent: Nov. 22, 2011

(54) SOLUTION SEARCH FOR SOFTWARE SUPPORT

(75) Inventors: Roman Rapp, Villeneuve-Loubet (FR);
Constantin Savu, Antibes (FR);
Tilmann Haeberle, Wiesloch (DE);
Thomas Schneider, Heidelberg (DE);
Olena Kushakovska, Cannes (FR);
Jean-Pierre Djamdji, Nice (FR)

(73) Assignee: SAP AG, Walldorf (DE)

( * ) Notice: Subject to any disclaimer, the term of this patent is extended or adjusted under 35 U.S.C. 154(b) by 435 days.

(21) Appl. No.: 12/199,773

(22) Filed: Aug. 27, 2008

(65) Prior Publication Data
US 2010/0057677 A1    Mar. 4, 2010

(51) Int. Cl.
*G06F 17/30* (2006.01)

(52) U.S. Cl. ........ 707/759; 707/758; 707/769; 707/770; 707/705; 707/706; 707/707; 707/708; 707/709

(58) Field of Classification Search .......... 707/705–709, 707/758, 769–770; 717/104, 136; 715/248; 706/47; 714/49
See application file for complete search history.

(56) References Cited

U.S. PATENT DOCUMENTS

| | | | |
|---|---|---|---|
| 5,414,836 A | 5/1995 | Baer et al. | |
| 6,177,932 B1 | 1/2001 | Galdes et al. | |
| 6,266,788 B1 | 7/2001 | Othmer et al. | |
| 6,336,139 B1 | 1/2002 | Feridun et al. | |
| 6,957,206 B2 * | 10/2005 | Nolan | 706/47 |
| 7,386,541 B2 * | 6/2008 | Pal et al. | 1/1 |
| 7,571,179 B2 | 8/2009 | Meyers et al. | |
| 7,574,652 B2 * | 8/2009 | Lennon et al. | 715/248 |
| 7,877,392 B2 * | 1/2011 | Grieselhuber et al. | 707/748 |
| 2003/0195775 A1 | 10/2003 | Hampton et al. | |
| 2004/0015823 A1 * | 1/2004 | Nolan | 717/104 |
| 2004/0139106 A1 * | 7/2004 | Bachman et al. | 707/104.1 |
| 2004/0199905 A1 * | 10/2004 | Fagin et al. | 717/136 |
| 2005/0033626 A1 | 2/2005 | Kruse et al. | |
| 2005/0033631 A1 | 2/2005 | Wefers et al. | |
| 2005/0138486 A1 * | 6/2005 | Gromyko | 714/49 |
| 2006/0026467 A1 | 2/2006 | Nehab et al. | |
| 2006/0041869 A1 | 2/2006 | Houston et al. | |
| 2006/0112106 A1 | 5/2006 | Wolf et al. | |
| 2006/0143034 A1 | 6/2006 | Rothermel et al. | |
| 2006/0259272 A1 | 11/2006 | Sattler et al. | |
| 2007/0050678 A1 | 3/2007 | Estes et al. | |
| 2007/0136342 A1 | 6/2007 | Singhai et al. | |
| 2007/0164849 A1 | 7/2007 | Haeberle et al. | |
| 2007/0174260 A1 * | 7/2007 | Bachman et al. | 707/3 |
| 2007/0174716 A1 | 7/2007 | Erdtmann et al. | |
| 2007/0294258 A1 | 12/2007 | Caldwell et al. | |
| 2008/0071766 A1 * | 3/2008 | Grieselhuber et al. | 707/5 |
| 2008/0104455 A1 | 5/2008 | Ramarajar et al. | |
| 2008/0262860 A1 | 10/2008 | Schneider et al. | |

OTHER PUBLICATIONS

Notice of Allowance for U.S. Appl. No. 12/199,772, mailed Nov. 8, 2010, 8 pages.
Non-Final Office Action for U.S. Appl. No. 12/199,772, mailed Jul. 21, 2010, 16 pages.
Notice of Allowance for U.S. Appl. No. 12/199,772, mailed Feb. 14, 2011, 12 pages.

* cited by examiner

*Primary Examiner* — Frantz Coby
(74) *Attorney, Agent, or Firm* — Brake Hughes Bellermann LLP

(57) ABSTRACT

A search middleware may be used to receive search requests regarding a software incident associated with a software application. The search requests may be populated with attribute values determined based on context data associated with the software application and collected in association with the software incident. The search requests may be dispatched to a subset of a plurality of solution repositories, even if the solution repositories have different interfaces and/or search technologies. The resulting solution documents retrieved from the solution repositories may be compiled for presentation on a solution search interface.

20 Claims, 8 Drawing Sheets

FIG. 6

INCIDENT: SALES ORDER QUOTATION FORM — 700

PERSONALIZE  HELP

STATUS OPEN  ID 220675  PRIORITY MEDIUM  REPORTED ON 12.08.2006  REQUESTER PHILIP BISHOP

[SAVE] [CANCEL] [PREVIEW▾] [NEW▾] [TAKE OVER] [START REMOTE SUPPORT] [ACTIONS▾]  YOU CAN ALSO ▾

702

/ MAIN DATA / KNOWLEDGE BASE / ACTION LOG / INCIDENT CONTEXT / ATTACHMENTS /

DETAILS: PRICING SALES ORDER — 706

REQUESTER QUESTION AND ANSWER

▸ WHAT KIND OF ISSUE DO YOU HAVE?
  I HAVE A QUESTION
▸ PLEASE ENTER A QUESTION
  IN THE SALES WORK CENTER, THERE IS SOMETHING...
▸ WHAT KIND OF INFORMATION ARE YOU MISSING
  A FORM IS MISSING
▸ COULD YOU PROBLEM BE SOLVED? (10 RESULTS)
  NO, THE PROBLEM COULDN'T BE SOLVED

REQUESTER SEARCH RESULTS — 704

| NUMBER | SEARCH TERM | HITS |
|---|---|---|
| 1 | SALES ORDER | 2131 |
| 2 | PRICING OF SALES ORDER | 57 |
| 3 | ERROR PRICING | 3 |
| 4 | ERROR PRICING | 3 |

SEARCH
FIND [SALES ORDER]  [GO] — 708

SOLUTION COLLECTION — 710

| ID | TITLE | STATUS | KNOWLEDGE BASE CODE | ORIGIN |
|---|---|---|---|---|
| 4711 | CAN I CREATE A NEW SALES ORDER BASED... | REJECTED | LOCAL WEKTRA CONTENT | KEY USER |
| 192193 | CONFIRMED BUG: PRICING FAILS WHEN... | ACCEPTED | SAP KNOWLEDGE LIBRARY | SAP |
| 149812 | HOTFIX FOR ISSUES WITH TEXT CONTROL | TO BE IMPLEMENTED | SAP KNOWLEDGE LIBRARY | SAP |
| 4711 | CAN I CREATE A NEW SALES ORDER BASED... | REJECTED | LOCAL WEKTRA CONTENT | KEY USER |
| 192193 | CONFIRMED BUG: PRICING FAILS WHEN... | ACCEPTED | SAP KNOWLEDGE LIBRARY | SAP |
| 149812 | HOTFIX FOR ISSUES WITH TEXT CONTROL | TO BE IMPLEMENTED | SAP KNOWLEDGE LIBRARY | SAP |

[SAVE] [CANCEL] [PREVIEW▾] [NEW▾] [TAKE OVER] [START REMOTE SUPPORT] [ACTIONS▾]  GO TO... ▾  YOU CAN ALSO ▾

SEARCH RESULTS — PERSONALIZE

[ SAVE AND CLOSE ] [ CANCEL ]

FIND [ SALES ORDER ] [ GO ]   SHOW SEARCH ATTRIBUTES

YOUR SEARCH RETURNED 265 RESULTS

FAQ (FREQUENTLY ASKED QUESTIONS)

CAN I CREATE A NEW SALES ORDER
SALES ORDER > FAQ

CAN I CREATE A NEW SALES ORDER BASED ON AN EXISTING SALES ORDER?
SALES ORDER > FAQ

SEARCH RESULTS FOR SALES ORDER (265)

| ALL (265) | FAQ (5) | WORTH KNOWING (7) | KNOWLEDGE LIBRARY (3) | COMMUNITY (123) | SAP WIKI (12) | SAP CASE LIBRARY (115) |

ALL RESULTS > SALES ORDER > INCO TERMS > FREE ON BOARD

NARROW DOWN YOUR SEARCH
PRICING (3)   ATP CHECK (1)   ASSESSMENTS (1)   DEMOS (3)   SCOPING (1)

CAN I CREATE A NEW SALES ORDER BASED ON AN EXISTING SALES ORDER?
SALES ORDER > FAQ
☆ ☆   [ ADD TO COLLECTION ]

ASSESSMENT: CREATE A SALES ORDER
SALES ORDER > ASSESSMENTS
☆ ☆   [ ADD TO COLLECTION ]

DEMO: CREATING A SALES ORDER
SALES ORDER > LEARNING CENTER
☆ ☆   [ ADD TO COLLECTION ]

ASSESSMENT: CREATE A SALES ORDER
SALES ORDER > ASSESSMENTS

[ CANCEL ]

[ SAVE AND CLOSE ]

---

SOLUTION COLLECTION: 9 ITEMS

CAN I CREATE A NEW SALES ORDER BASED ON AN EXISTING SALES ORDER?
SALES ORDER > FAQ   DELETE

ASSESSMENT: CREATE A SALES ORDER
SALES ORDER > ASSESSMENTS   DELETE

DEMO: CREATING A SALES ORDER
SALES ORDER > LEARNING CENTER   DELETE

ASSESSMENT: CREATE A SALES ORDER
SALES ORDER > ASSESSMENTS   DELETE

SALES ORDER WORK CENTER
SALES ORDER > ASSESSMENTS   DELETE

ASSESSMENT: CREATE A SALES ORDER
SALES ORDER > ASSESSMENTS   DELETE

SALES ORDER WORK CENTER
SALES ORDER > ASSESSMENTS   DELETE

ASSESSMENT: CREATE A SALES ORDER
SALES ORDER > ASSESSMENTS   DELETE

SOLUTION SEARCH FOR SOFTWARE SUPPORT

TECHNICAL FIELD

This application relates to software support and, more particularly, to servicing, administering, or otherwise supporting software applications.

BACKGROUND

Organizations and businesses depend on software deployed throughout their computing infrastructures to perform tasks relevant to their respective fields. As these entities begin using more enterprise software solutions, enterprise-wide software support becomes a necessary corollary to the software itself, as technical issues and performance errors may inevitably arise during the software's normal operations. For example, a customer may experience technical errors affecting the operations of the current software. In some support solutions, the customer may be required to submit or report the error through a manual process. Upon receiving the error report or notice, the support provider may manually analyze the error, diagnose the problem, and determine the proper solution. Once found, the support provider may relay the solution to the customer, who may then attempt to implement the steps of the provided solution. In some of these situations, such as those involving a customer support phone hotline, the customer generally needs a rudimentary level of knowledge regarding the software to ensure that the dialog between the technical consultant and the customer is clear enough to allow for a successful resolution to the issue.

In other support solutions, a searchable knowledge base may be provided. Thus, when an error occurs, the customer may manually search a listing of provided solution documentation for common errors that may occur within the software application. For more robust software applications, the related knowledge base may include multiple levels of solutions, requiring significant time and effort by customers or support experts to find, and then decipher, the correct solution. Even after locating a suitable solution, implementing the steps may be too difficult for customers without advanced knowledge of or access to the application. In some situations, the support provider may offer a help desk where customers may submit a ticket describing an error. The ticket may be reviewed by an employee of the solution provider, who then analyzes the error and attempts to provide solutions.

The set of current support solutions normally require both customers and support providers to manually generate potential solutions. Thus, customer support requires time- and resource-consuming actions. Some errors may occur frequently, giving the support provider the experience necessary to quickly solve the customer's error. Other errors, however, may occur much less frequently, thus prompting the support provider or the customer to spend larger amounts of time searching for relevant solutions.

SUMMARY

According to one general aspect, a system may include a search middleware configured to receive a search request for a solution to a software incident from at least one consumer search user interface (UI), via a search interface, and to conduct a search of at least two solution repositories of a plurality of solution repositories for a possible solution to the incident, based on the search request, and further configured to return a combined solution search result to the consumer UI. Each of the plurality of solution repositories contains documents of a solution type and is associated with an index configured to store attributes associated with at least some of the documents, and to store at least one attribute value associated with each attribute, a native search interface configured to search the index based on the attributes and thereby obtain at least some of the documents containing at least one of the attributes and attribute value, and a repository search interface configured to map the search request between the search interface and the native search interface, including mapping at least one attribute or attribute value specified by the search request into a format for searching using the index. The search middleware may include a search source manager configured to select the at least two solution repositories from the plurality of solution repositories, based on the search request, an attribute manager configured to associate the attributes commonly between each of the plurality of repositories, and to associate these attributes with the index of each repository, a search dispatcher configured to receive the search request expressed using the attributes and provide the search request to repository interfaces of the at least two solution repositories for translation for input to respective native interfaces thereof for conducting a search for the attributes using the indices of each of the at least two repositories to obtain the documents, and to receive the search result from each repository, and a search compiler configured to receive the documents and compile them into the solution search result for providing to the consumer search UI including an identification of a source solution repository of each document in the search result.

According to another general aspect, search middleware may be used to provide solutions for software incidents, and the search middleware may include a search interface configured to receive a solution search request from at least one consumer search user interface (UI), the solution search request referencing a software incident of a software application and including context data collected about the software application at the time of the software incident. A solution source manager may be configured to receive the solution search request and select at least two solution repositories from among a plurality of solution repositories, and based on the consumer search UI, and further configured to determine corresponding communication techniques for communicating with the at least two solution repositories. An attribute manager may be configured to determine attribute values based on the context data, where the attribute values may be selected from a plurality of attributes and attribute values that are maintained in common for the plurality of solution repositories by the attribute manager. A search dispatcher may be configured to dispatch the search request to the at least two solution repositories, including the attribute values and using the corresponding communications techniques. At least one index may be associated with the at least two solution repositories and may be configured to index documents within the at least two solution repositories, based on the attributes and attribute values. A repository search interface may be associated with each of the at least two solution repositories and configured to translate the search request for input to a native interface for a search of the at least two solution repositories using the at least one index to retrieve solution documents. A search compiler configured to receive the solution documents and compile them into a solution search result for providing to the at least one consumer search UI including an identification of a source solution repository of each solution document in the solution search result.

According to another general aspect, a method may include receiving a solution search request from at least one consumer search user interface (UI), the solution search request referencing a software incident of a software application and including context data collected about the software application at the time of the software incident. At least two solution repositories may be selected from among a plurality of solution repositories, and based on the consumer search UI. Corresponding communication techniques may be determined for communicating with the at least two solution repositories. Attribute values may be determined based on the context data, the attribute values selected from a plurality of attributes and attribute values that are maintained in common for the plurality of solution repositories. The search request may be dispatched to the at least two solution repositories, including the attribute values and using the corresponding communications techniques. The search request may be translated for input to a native interface for a search of the at least two solution repositories using at least one index to retrieve solution documents, the at least one index associated with the at least two solution repositories and configured to index documents within the at least two solution repositories based on the attributes and attribute values. The solution documents may be compiled into a solution search result for providing to the at least one consumer search UI, including an identification of a source solution repository of each solution document in the solution search result.

BRIEF DESCRIPTION OF THE DRAWINGS

FIG. 6 is a first screenshot of an example solution-related UI that may be used in the systems of FIGS. 1, 3, and 4.

FIG. 7 is a second screenshot of an example solution-related UI that may be used in the systems of FIGS. 1, 3, and 4.

FIG. 8 is a third screenshot of an example solution-related UI that may be used in the systems of FIGS. 1, 3, and 4.

DETAILED DESCRIPTION

Figure 1:
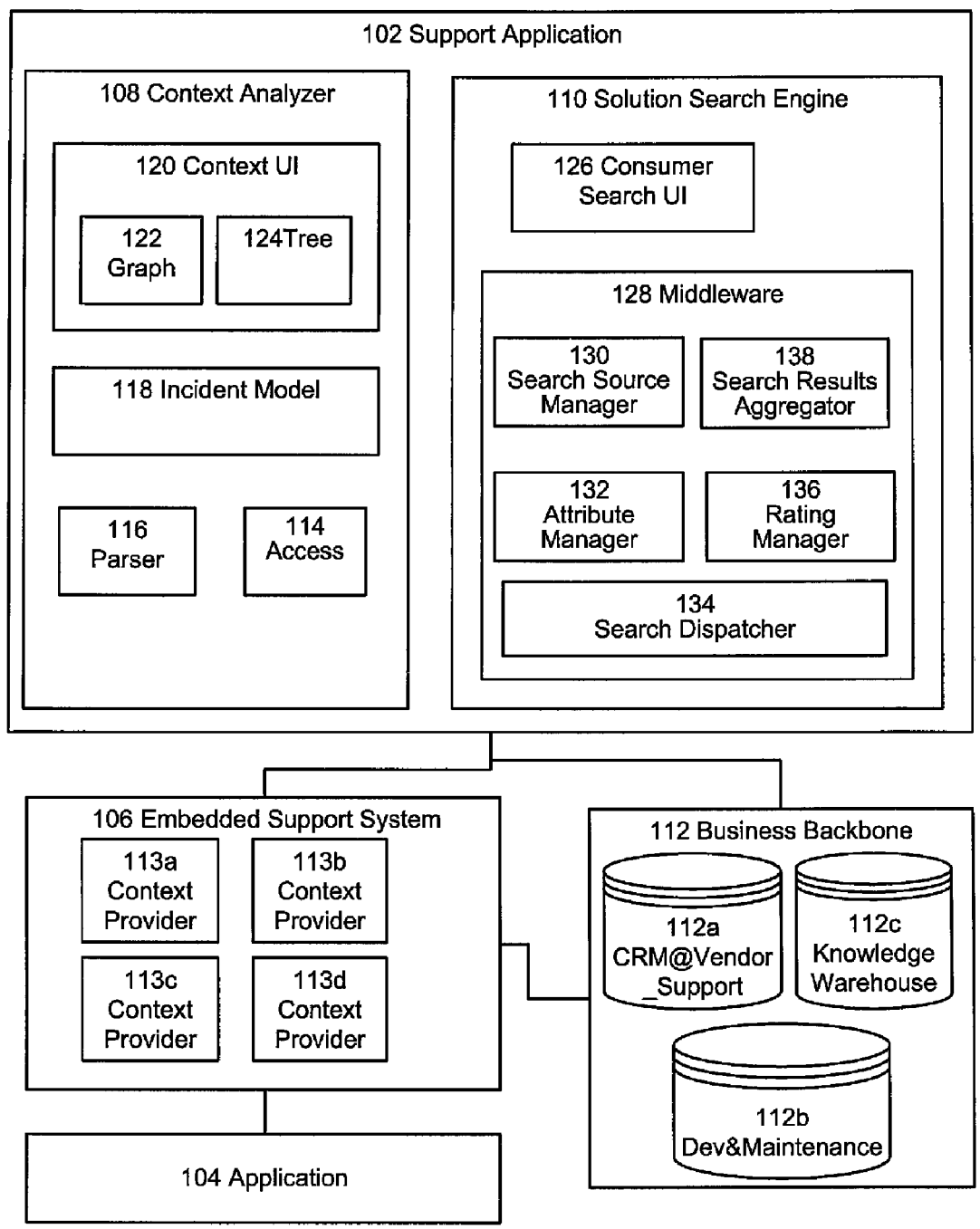
FIG. 1 is a block diagram of a system for context analysis and solution search for software support.

FIG. 1 is a block diagram of a system for context analysis and solution search for software support. In the example of FIG. 1, a support application 102 provides support for an application 104, such as a business application, that may be running, e.g., at a customer site(s). Software support may be provided by a vendor or other provider of the application 104, illustrated in the example of FIG. 1 as embedded support system 106.

In the example of FIG. 1, it may occur that an incident occurs at the application 104 as experienced by the customer. For example, the application 104 may not perform as desired, e.g., may perform a function incorrectly, or may not perform a desired function at all. In FIG. 1, the embedded support system 106 may be operable to determine information about the incident, where such information may include, for example, static or dynamic (e.g., current) information about the application 104, or about hardware/software used by the customer to implement the application 104, or used in conjunction with implementation of the application 104. The embedded support system 106 may further provide, for example, information about one or more users of the application 104, or information provided by the user(s) regarding the user, or information about potential solutions/corrections for the incident. These illustrative and non-limiting examples of information that may be provided by the embedded support system 106 demonstrate the fact that the embedded support system 106 may output a relatively large amount of potentially non-homogeneous, non human-readable information regarding the incident. For example, the embedded support system 106 may output these and other types of information as a large number of eXtensible Mark-up Language (XML) documents, which may vary in format relative to one another and which may, in any case, be unsuitable for human review and consumption in any practical sense.

Consequently, the support application 102 may include a context analyzer 108 that is operable to receive the non-homogeneous, non human-readable information, and to convert this information for presentation to a user (e.g., to support personnel of the software vendor for the application 104). The context analyzer 108 performs this conversion in a manner that is efficient and that takes advantage of available resources to present the information to the support user in a manner that allows the support user to quickly visualize and/or understand the incident and the relevant, surrounding circumstances. Then, a solution search engine 110 may be used by the support user, for example, to receive the converted information regarding the incident, and to determine (i.e., search for) a possible solution(s) to the incident.

In the example of FIG. 1, a business backbone 112 is illustrated that may represent a global or vendor-wide data store of information relevant to vendor-supplied software applications, including the application 104. For example, for an application such as Customer Relationship Management (CRM) applications, and other applications, the business backbone 112 may include data 112a, 112b, 112c related to, respectively, CRM support data applications (storing, e.g., customer-specific data at the vendor), development and maintenance data (which may include specific information about such a CRM application at a particular customer), and knowledge warehouse data. Thus, as may be appreciated, such data may provide information to vendor support personnel or other users such as previously recognized incidents and solutions or other information useful in recognizing or resolving incidents determined by the embedded support system 106. In the example of FIG. 1, the business backbone 112 may store or access customer configuration data related to a customer having the application 104 installed/configured locally, so as to use this information in resolving reported incidents. Further in this example, the business backbone 112 may include one or more software models upon which the application 104 may be based, as described in more detail below.

In FIG. 1, then, the context analyzer 108 may receive a report of an incident from the embedded support system 106, along with various types of contextual information related to the incident. In this regard the embedded support system 102 may be considered to include various context providers 113a, 113b, 113c, 113d having different properties (e.g., interfaces) which are dependent on factors such as, for example, local hardware/software platforms of the application 104. These context providers may provide context information as described above, e.g., in different, non human-readable documents. For example, different context providers may provide XML documents which are formatted (e.g., tagged) differently from one another, so that, for example, it may be difficult to recognize when the two documents contain the same or related information. Further, one or more context providers may each be associated with a different software layer and/or platform (e.g. ABAP, Java, .NET) used to implement the application 104, such as a User Interface (UI) layer, an object layer, or an application server layer, so that context information produced by these context providers may further be inhomogeneous in construction and presentation, and so that resulting documents describing the context information may also be difficult for human users to utilize in an efficient and practical way.

Such documents or other context information may be received at an access module 114 of the context analyzer 108, and/or at a context parser 116 of the context analyzer 108. For example, the access module 114 may receive an incident message and context information about a software incident, and may be responsible for separating/categorizing different incidents or otherwise maintaining consistency of the received information.

The access module 114 also may be responsible for accessing the business backbone 112, in order to enhance or modify the received incident message and context information. For example, the access module 114 may access customer configuration information from the business backbone 112, and/or may access model information (i.e., may access one or more models which were used to design or modify the application 104 or relevant portions thereof), as described in more detail herein.

The context parser 116, as just referenced, may be configured to receive the incident/context information, and to provide a uniform, human-readable version or model of this information. For example, as referenced above, different context providers of the embedded support system 106 may provide incident and context information differently from one another, such as may occur between a system context provider and a user interface (UI) context provider, or as may occur when multiple organizations or platforms are involved with the application 104 (or user thereof). Then, in some implementations, the context parser 116 may use and/or create a new interface to provide a uniform access for an incident model generator 118 for different context providers. For example, a separate implementation of the interface (context parser 116) per context provider may be implemented. Additional, alternative, and/or more detailed examples of the operation(s) of the context parser 116 are provided herein.

Thus, the incident model generator 118 may output an incident model as a uniform representation of a particular incident and associated context information, as well as any information used to enrich/enhance the incident/context information (such as the customer configuration or software model(s)) as provided by the context parser 116 and/or the access module 114. The resulting incident model may be provided to a support user or other user using a context UI 120, by way of which the incident model may be presented, for example, as a graph 122 or a tree 124.

Once the incident model is constructed, the solution search engine 110 may be implemented to determine possible solutions to the incident in question. In general, the solution search engine 110 may search relevant memories, such as, for example, previous solutions to the same or similar incident(s), model information related to a model(s) upon which the application 104 was constructed, or configuration information related to how the application 104 may be configured for implementation at the site of the particular customer/user.

A consumer search UI 126 may be included that allows the support user to construct search queries for solutions to the relevant incident. In some implementations, fields of the consumer search UI 126 may be auto-filled based on the incident model generator 118. In some implementations, the solution search may occur over a number of different platforms and/or organizations. Further, the searches may vary depending on local customer configurations and other relevant parameters. In the example of FIG. 1, search middleware 128 may be included to allow for searching of such heterogeneous search arenas, and for presentation thereof in a uniform and consistent manner within the consumer search UI 126. Examples of the solution search engine 110, the consumer search UI 126, and the search middleware 128 are provided in detail, below.

As referenced above, the access module 114 may be used to enhance context information received from the embedded support system 106. One aspect of enhancing the contextual information may include accessing the data from a highly modeled Enterprise Service-Oriented Architecture (eSOA), and to access customer specific information in a support business backbone such as the business backbone 112 (e.g. configuration, system installation information, or recent incidents and solutions). In some implementations, then, rules and methods may be used to generically access the needed information depending on customer specific data, like software component, version, and/or configuration settings in different systems. Related techniques may be used for more traditional, non-modeled environments, as described herein.

The access module 114 may include or access an incident adaptor (not shown in FIG. 1) which may be used to read incidents. In general, for example, incidents can be read locally in a customer system or via a remote interface provided by the Business Backbone 112 (e.g., a CRM backbone). Depending on whether some or all of the support application 102 is running in the customer environment or in a vendor support environment, the incident adapter interface may allow for reading of the incident data seamlessly, hiding technical aspects of the source of information, including system address.

Figure 2:
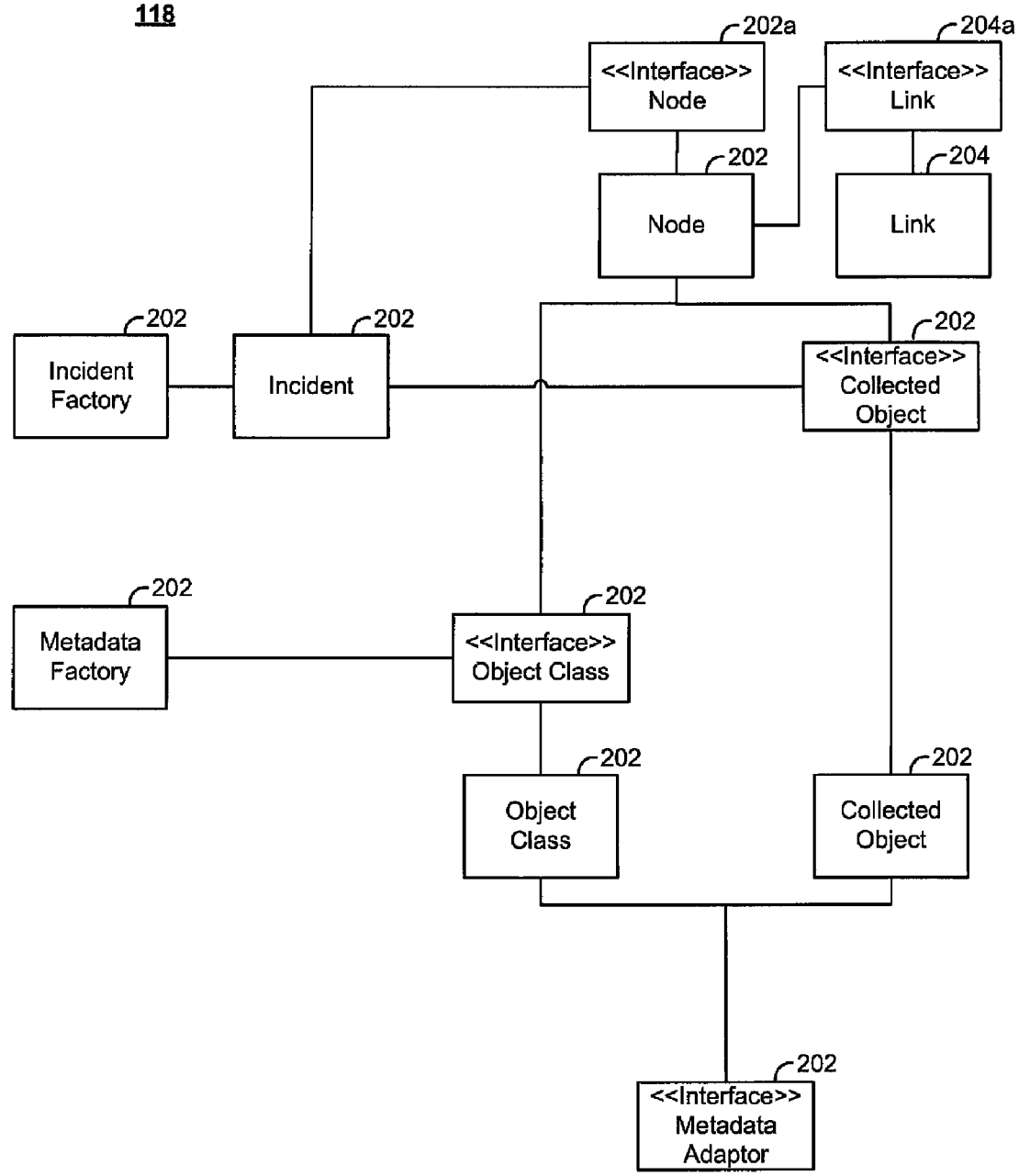
FIG. 2 is a block diagram of an incident model of FIG. 1

As referenced above, the context parser 116 allows for analysis of incident/context information to provide heterogeneous, non human-readable information into consistently-presented, visually-convenient information, such as in, for example, the incident model of FIGS. 1 and 2. More specifically, context information may be collected for an incident message at the embedded support system 106 and the resulting information may be automatically routed to a key user for software support. The context information may be attached to the incident (message) in a technical (e.g. XML format) and inhomogeneous way (e.g. different context providers for eSOA, system or UI information) that is not easily readable by human beings. The key user is supposed to analyze this information to proposal a solution for the incident.

For example, incident context handling may be a complex process with many involved parties/organizations, such as may be involved in platform development or infrastructure development. Each such organization may have its own standards for interface specifications and context collection. In practice this may lead to a complex interaction between all of the parties, and differences in final status, structure and content of different context providers.

The context parser 116 may thus be configured to be instrumental to receive, parse, harmonize and enhance the different context information to provide the base to re-convert such information into easily human readable information and to be later able to store it in an internal format and present it to a key user, e.g. a customer application manager, hosting provider administrator or vendor support employee. Especially in a highly modeled Enterprise Service-Oriented architecture, as described herein, the enhancement may be used to leverage the available metadata information.

In some implementations, as referenced above, a new interface may be created to provide a uniform access from/for the incident model generator 118 for different context providers, e.g., one or more specialized context parsers within the context parser 116 may be used for corresponding context provider(s), each having (or having access to) a common interface with the incident model generator 118. Thus, e.g., a separate implementation of the interface per context provider may be implemented. The creation of the instances of the context parsers and processing of the context fields may be managed by the incident and depends on the context attachments available in the incident. The context parsing is capable of processing attachment XML files which undergo certain changes, such as, for example, a change in the naming scheme(s) or sequence of XML tags, or addition of new tags which is silently ignored by older implementations (without program termination). The context providers may collect the information on, for example, User Interaction, Technical Component, Software Components, Business Objects, Agents, Communication Messages and UI involved in the incident. As described, in order to present the complete picture of the incident the context collected by the providers may be enhanced with information available from Enterprise Service modeling.

A name of the context provider (e.g., supplied by the vendor) may be the basis for determining the implementing class and the return parameters type for the parsing of XML content of the provider. Information provided by ABAP, Java or .NET context providers may be treated likewise and information may be harmonized within the incident.

To ensure the correct versioning of the metadata of the entities involved in the incident, the file of a Software Component context provider (e.g., an ABAP software component provider) may be processed first, as a common context parser used to parse context information of all available context providers. The context attachments of the incidents of other context providers may be parsed without specific order. A parse_context( ) method may be used to process provider-specific XML tags or may use predefined structures to extract the information from XML files into predefined tables. The results of the parsing may be processed immediately and the relevant incident entities are created. The context and/or error information available within each context provider may be assigned to the entities. The semantical links between the incident entities which can be extracted from context providers are created. The Enterprise Service Repository Information is used to create additional links which may not be available within context providers. Thus, the structure of the incident entities in a humanly-readable way and form as such is ensured during context parsing.

As referenced above, the incident model output by the incident model generator 118 may refer to a standardized model to store the harmonized, enhanced, collected incident contextual information in a pre-defined structure (e.g., a net-like structure) including the possibility to enrich it with metadata from a highly modeled Enterprise Service-Oriented architecture like SAP Application Platform and to save the collected information in a database.

FIG. 2 is a block diagram of the incident model of the incident model generator 118 of FIG. 1, and the following discussion is partially in reference thereto. For example, as shown in FIG. 2, the incident model may, for example, contain the following basic entities: nodes 202 (and interfaces 202a), links 204 (and interfaces 204a), collected objects 206 (and interfaces 206a), object classes 208 (and interfaces 208a), incidents 210, an incident factory 212, and a metadata factory 214.

As shown, then, such a net structure may be represented and fully defined by nodes and by links connecting the nodes. Depending on its category, a node represents either a collected object, or an object class. An object class 208 may represent an object within a service oriented architecture (SOA object). Examples are Business Objects, Business Object Nodes, Messages, Deployment Units, and UIs. An object class may be instantiable or may be abstract. Each collected object 206 refers to exactly one object class, while an instantiable object class may be referred to by several collected objects. A collected object represents a specific SOA object instance that has been collected during the incident creation.

For example, an object class 'Business Object Sales Order', may be referred to by the collected objects 'Sales Order 100011' and 'Sales Order 100012'. Hence, the collected object holds the contextual information belonging to a specific instance of a SOA object, while the object class holds the metadata common to all instances of this SOA object. In the example, the object class 'Business Object Sales Order', specifies that a sales order has one or several items, with a certain attributes and their properties. The collected object 'Sales Order 100011' contains the actual values of these attributes for the specific sales order 100011.

Both the object class as well as the collected object may have access to a layer that provides them with metadata of the SOA model. The object class has this access to retrieve metadata information on the object, like its structure and general properties, by way of a metadata adaptor 216. The collected object 206 might need this access in order to get information necessary to interpret specific collected values.

The metadata information requested by the object class will in general be related to the specific SOA object represented by this object class (e.g. the structure of the sales order item), while the collected object will in general need data that is not object specific but situated rather at the attribute level (e.g. a code list, needed to interpret the value of a specific code). In a specific implementation of this concept, the object class and the collected object might be represented by abstract classes. From the abstract class representing the object class, concrete class might be derived by inheritance, one for each SOA object. From the abstract class representing the collected object, concrete classes might inherit for each instantiable SOA object, where potentially instance data might be collected at run time.

A totality of the data that has been collected for one incident may be represented by the incident entity 210. Since each node corresponds to a specific incident, nodes may be stored by incidents. Since each collected object corresponds to a specific incident, collected objects also may be stored by incidents. Since an object class may occur in different incidents, the object class instances need not be stored by an incident, but in an independent entity, shown in FIG. 2 as the metadata factory 214. If the incidents are created on the basis of software that is available in different releases, a possible implementation might be to allow one metadata factory instance per release. Another example approach would be to implement the metadata factory as a singleton (i.e., allow only one metadata factory instance overall) and implement the release information as an attribute of the object class. The different incidents may be handled by the incident factory, which may be the main entry point for all external calls. The incident factory 212 also may be implemented as a singleton.

There are a number of example use cases for external applications that may be covered by an API of the incident model 200. For example, the API may be configured to read the entire net structure of a specific incident, e.g. to display it as net or to transform it into a tree like hierarchy. In this case, the consumer of the API may retrieve a desired incident factory instance. From the incident factory instance the consumer may retrieve the relevant incident, and from the incident the consumer may retrieve the list of nodes and links that define the net.

In another example, the API may be configured to access the collected data of a collected object represented by a specific node. In this case, the consumer of the API may retrieve the desired incident factory instance. From the incident factory instance the consumer may retrieve the relevant incident. From the incident the consumer may retrieve the required node instance. From this node instance the consumer may retrieve the corresponding collected object. The collected object provides its collected data.

In another example, the API may be configured to access metadata corresponding to an object class represented by a specific node. In this case, the consumer of the API may retrieve the desired incident factory instance. From the incident factory instance the consumer may retrieve the relevant incident. From the incident the consumer may retrieve the required node instance. Depending on the node category, the relevant object class might be associated to the node either directly or via a collected object. In the first case, the consumer will retrieve the object class instance directly from the node instance. In the second case, the consumer will first retrieve the collected object instance from the node and then the object class instance from the collected object instance. From the object class instance the consumer can then retrieve the relevant metadata information.

To enable a support user to analyze the incident model, there may be ways to display it on a screen, such as the context UI 120. One alternative is to display the incident data in a graphical format, underlying the network structure of the data, as well as the object relationships within this incident, which allows the support (key) user to have an instantaneous global picture of the incident. For example, the graphical tool used for display may be the SAP Maestro tool.

For example, an Incident model generator 118 may be a complex representation with many involved objects, such as Business Objects, Process Components, Development Units, and agents. Each of these Objects may have a special role and may only exist under special conditions. In practice this may lead to a complex interaction between all of the parties, and a complex representation.

The context UI 120 may thus relate to how to create, starting from the incident model 200, the object hierarchical information as well as their relationships. These relationships can then be described in any required format for rendering. For example, a Process Interaction Model XML file may be generated for display by, e.g., the SAP Maestro rendering tool. As the PIM makes use exclusively of Business Object entities, Associations are searched between Business Object instances. Relationships to other instances may exist but need not be used for the PIM model.

Incident entities may be gathered out of the incident, filtered on a Business Object level, and processed for building up the relationships. As the Business Object may be a complex data representation, holding many nodes, with many levels, embedded in each other, each node being able to be linked to any other Business Object Node, and as the PIM makes use of Business Objects only, the search procedure may be done recursively, in two main directions: Downward (from the Business Object root node level towards its nodes) and Upward (from the Business Object node level to its main root parent).

In some examples, first the search is made, for one Business Object entity (denoted as the source BO), for one node, downward until an external link to another Business Object is found (denoted as the Target BO), then the search start upward on the new Target Business Object until its Root node is reached. Then the Association is created between the two Business Objects. In these examples, the process is reiterated on all nodes and all level of the source Business Object and this for all the Incident Business Objects. Once all relationships have been established, the PIM XML file is generated, by specifying the available Business Objects and the existing relationships between them. The Maestro Tool or other appropriate tool may extract, and, based on this, file the Corresponding Process Components and Development Units and display the relationships between the Business Objects.

The incident model 200 may be presented in other forms, such as the tree model 124, which may be a suitable solution when the incident relates to many entities. For example, rules and methods may be implemented for the incident model 200 having known entities. For example, rules may be defined to define which entities of the net that the hierarchy display should start with, how to group and filter them, how to determine the child node(s), and other relevant rules for constructing the tree(s).

The tree model 124 allows users to define rules as to how to project the incident model 200 into a tree/hierarchy, without need to implement specific coding. Different alternatives may thus be defined by any/every end-user, thereby increasing efficiency in analyzing net-like information in a hierarchy. Thus, by providing the contextual information in a comprehensive hierarchical format, the support user may quickly localize potential sources for the incident and thereafter determine a corresponding solution(s).

As referenced above, the solution search engine 110 may provide a framework for a harmonized search on different information sources (sometimes called 'solution search sources' or 'solution sources' in the following) based on a specific object that provides contextual information, e.g., for an incident. Specifically, the search middleware 128 may be configured to provide a central middleware for solution search. The search middleware 128 may be used to integrate the search API(s) from different knowledge repositories of different solution search sources.

The search middleware 128 may be used by several consumer UIs 126, i.e., search clients. For example, the consumer search UI 126 may represent a search UI implemented as a 'wizard' for a user to attempt to self-diagnose a solution to an existing incident. The consumer search UI 126 also may represent a search interface used by a key user (support personnel) of an enterprise executing the application(s) 104, or may represent a consumer search UI of a vendor of the application 104. Particularly in the latter regard, it will be appreciated that the term 'consumer' in this regard refers to the application 126 as a client or other UI which is used to access (i.e., consume) stored solution-relevant information, and does not necessarily refer to a consumer in the sense of a purchaser of the application(s) 104.

The search middleware 128 may provide a number of features and advantages. For example, the search middleware 128 may effectively provide a single solution source for the various types of consumer search UIs 126 referenced above, even when the sources (e.g., sources 112*a*, 112*b*, 112*c*, or other solution sources discussed with respect to FIG. 3 or otherwise within the following description) ultimately searched by the search middleware 128 vary in terms of, e.g., platform(s), search technology, owner, solution type, or other characteristic.

More particularly, the search middleware 128 may include a search source manager 130 that may be configured to determine which of the available solution search sources should be involved in a given solution search, as well as which type of corresponding technology should be used for each selected solution source. For example, different users of the solution search 110 may have different levels of access to the various solution search sources (e.g., databases or repositories). In other examples, different types of software incidents may be associated with particular solution search sources. Other criteria may be used to determine search targets to be used for a given received incident and associated incident model generator 118. Thus, the search source manager 130 may be configured to determine which of these search sources (e.g., solution repositories) should or must be searched to provide a potential solution to the current incident.

An attribute manager 132 may be configured to enhance performance characteristics of the search middleware 128, by providing for searching of documents within the various solution sources (e.g., repositories) based on indexed attributes and associated values that are assigned commonly and/or in harmonization with one another across the plurality of solution sources. That is, for example, the attribute manager 132 may ensure that search terms and other characteristics may be searched commonly across a plurality of solution repositories, even when the terms/characteristics are not used commonly within or among the solution repositories. The attribute manager 132 also may be part of the application 104, which can furthermore contain a Consumer Search UI 126 (e.g. incident wizard or key user search) to provide value help on the customer end.

For example, each of a first and a second solution repository, e.g., within the business backbone 112, may contain a document with a possible solution to a received incident. The incident may include a search term expressed as an abbreviation in a first language, while the first solution repository contains a solution document including the abbreviation in a second language, and the second solution repository contains another solution document including a non-abbreviated version of the search term in the first language. The attribute manager 132 allows the search middleware 128 to return both of the two solution documents in this example by ensuring common use and mapping of attributes and their potential values across the plurality of solution repositories. Further, by providing for indexing of the various attributes, the attribute manager 132 provides for increased performance efficiency and speed of the search process, since a full free text search of all the documents in all of the solution repositories is not necessary.

A search dispatcher 134 is then responsible for transmitting the search request to the appropriate solution repositories, expressed using the commonly-assigned and indexed attributes, and using the appropriate technology. Examples of operations of the search dispatcher 134 are provided in detail below, e.g., with respect to FIGS. 3 and 4.

A rating manager 136 may be used to allow users or automated means to assign a rating to retrieved solution documents. As with the attribute manager 132, the rating manager 136 may harmonize such ratings across the different solution sources/repositories. For example, documents stored in the different solution repositories may have internal rating schemes that differ from one another, and the rating manager 136 may map or translate between these different rating schemes to provide a common rating. More generally, by being positioned within the search middleware 128, the rating manager 136 may receive ratings from many different users and a number of different consumer search UIs, for documents that are stored across the plurality of possible solution repositories, and may maintain these ratings for future evaluation by subsequent users who receive solution documents as part of a future solution search.

A search results compiler 138 may be configured to receive all searched-for solution documents from the various solution repositories, consult the rating manager 136 to associate rating information therewith as just described, and then provide the compiled results (solution documents), or a subset thereof, to the requesting consumer UI 126. The search results compiler 138 may include an identification of which of the plurality of solution repositories was the source of a particular solution document, and may provide other information, such as, e.g., a correlation score between each returned solution document and the original search. The search results aggregator 138 may provide the compiled search results using an appropriate search UI.

Figure 3:
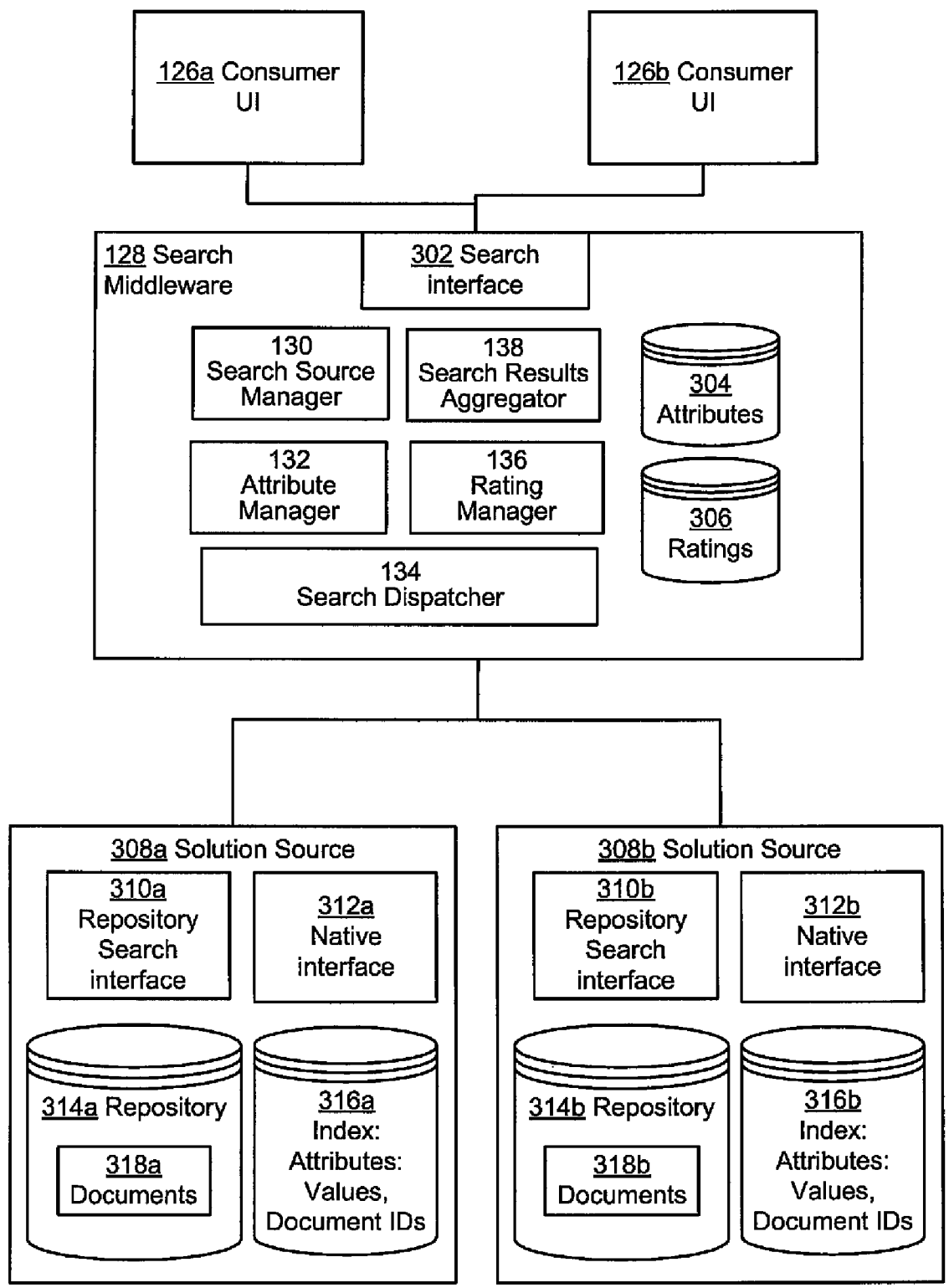
FIG. 3 is a block diagram of search middleware of FIG. 1.

FIG. 3 is a block diagram of the search middleware 128 of FIG. 1. In the example of FIG. 3, two consumer search UIs 126a, 126b are illustrated, which interface with a search interface 302 of the search middleware 128. As referenced above, the consumer UIs may be different in purpose and therefore in function and structure, such as when the consumer search UI 126a represents an incident wizard of a customer who has purchased the application 104, where the customer may be limited in an ability to access various ones of available solution search sources (shown in FIG. 3 as solutions sources 308a, 308b but conceptually including virtually any number 308n of solution sources). Meanwhile, the consumer search UI 126b may represent a search UI of the vendor of the application 104, who may have full access to all available solution sources. Despite such differences between the consumer search UIs 126a, 126b, the search interface 302 of the search middleware provides a single and common interaction point that therefore facilitates a design and implementation of the various consumer search UIs. The search interface 302 also may provide a guided search to assist a user in narrowing down search results. For example, in a search UI, the search interface 302 may provide a user with a high level attribute that returns a large number of solution documents. At the same time the search interface 302 may suggest the next attribute to be specified to best narrow down the solution result. For example, the search interface 302 may provide a GUI using question/answer pairs as done in the incident wizard for end user, as described herein. In other implementations, the search interface 302 also may offer the opposite approach, e.g., by starting the search with all known attributes from the context as done in the support studio for support experts. If no solution is found, the search can be widened by excluding one or more attributes from the search.

Further within the search middleware 128, FIG. 3 illustrates the presence of stored attributes and related data within a memory 304, as well as rating information for solution documents stored in a memory 306. The attributes 304 may include the attributes and possible values themselves, as well as current values from particular solution documents as temporarily stored (e.g., cached, as described with respect to FIG. 4 below), as well as information about the attributes, e.g., attribute metadata, that describes, for example, how the attributes are to be used as part of a solution search. For example, in the latter regard, some attributes may be designated as core attributes that, if present, must be included in a solution search for a given incident, while other attributes may be designated as able to be optionally included when finding a solution for a given software incident. Somewhat similarly, the rating memory 306 may include information about how the ratings are to be implemented by the rating manager 136 (e.g., different rating schemas), as well as particular ratings themselves.

In FIG. 3, solution sources 308a and 308b may represent two of a plurality of possible solution sources. Specific examples are provided below, e.g., with respect to FIG. 4, but in general the solution sources may include, for example, previous related incidents, knowledge base articles about the software application and/or incident, community discussions about the type of incident, previous solutions to similar incidents, customer configuration information that may assist in diagnosing the incident, model information about models used to create the software application in question, list of frequently-asked questions (FAQs), and virtually any other potential source of a solution for the incident in question.

Because the possible solution sources are so varied, the techniques for finding, accessing, or otherwise utilizing the solution sources may be similarly varied. For example, different solution sources may run on different platforms, such as Java, .Net, ABAP, or other available platform, and may use corresponding search technologies. Accordingly, for example, the solution source 308a may include a native (search) interface 312a that is configured to execute a search of a repository 314a containing documents 318a of a particular solution type (e.g., knowledge base articles) on a particular platform associated with a particular database scheme.

In FIG. 3, a repository search interface 310a is illustrated that is associated with the search middleware 128 and that is configured to allow the search dispatcher 134 to locate and utilize the solution source 308a, and further configured to map a search request from the search dispatcher 134 to the native interface 312a for executing the search on the repository 314a. For example, as may be appreciated from the above description, attributes included in the search request from the search dispatcher 134 may be mapped to the native search interface 312a in order to implement the correct search of the repository 314a.

As also described herein, an index 316a may be used to index the attributes and/or their values to corresponding ones of the documents 318a. For example, the index 316a may be implemented using TREX from SAP AG, or other suitable indexing tool. In the example of FIG. 3, the index 316a and corresponding index 316b in the solution source 308b are shown as being implemented within the respective solution sources and locally with the respective repositories 314a, 314b. In other implementations, however, the indices may be implemented as a single index associated with the search middleware 128, so that the search request from the search dispatcher 134 may utilize the index prior to being dispatched to the various solution sources 308a, 308b.

Figure 4:
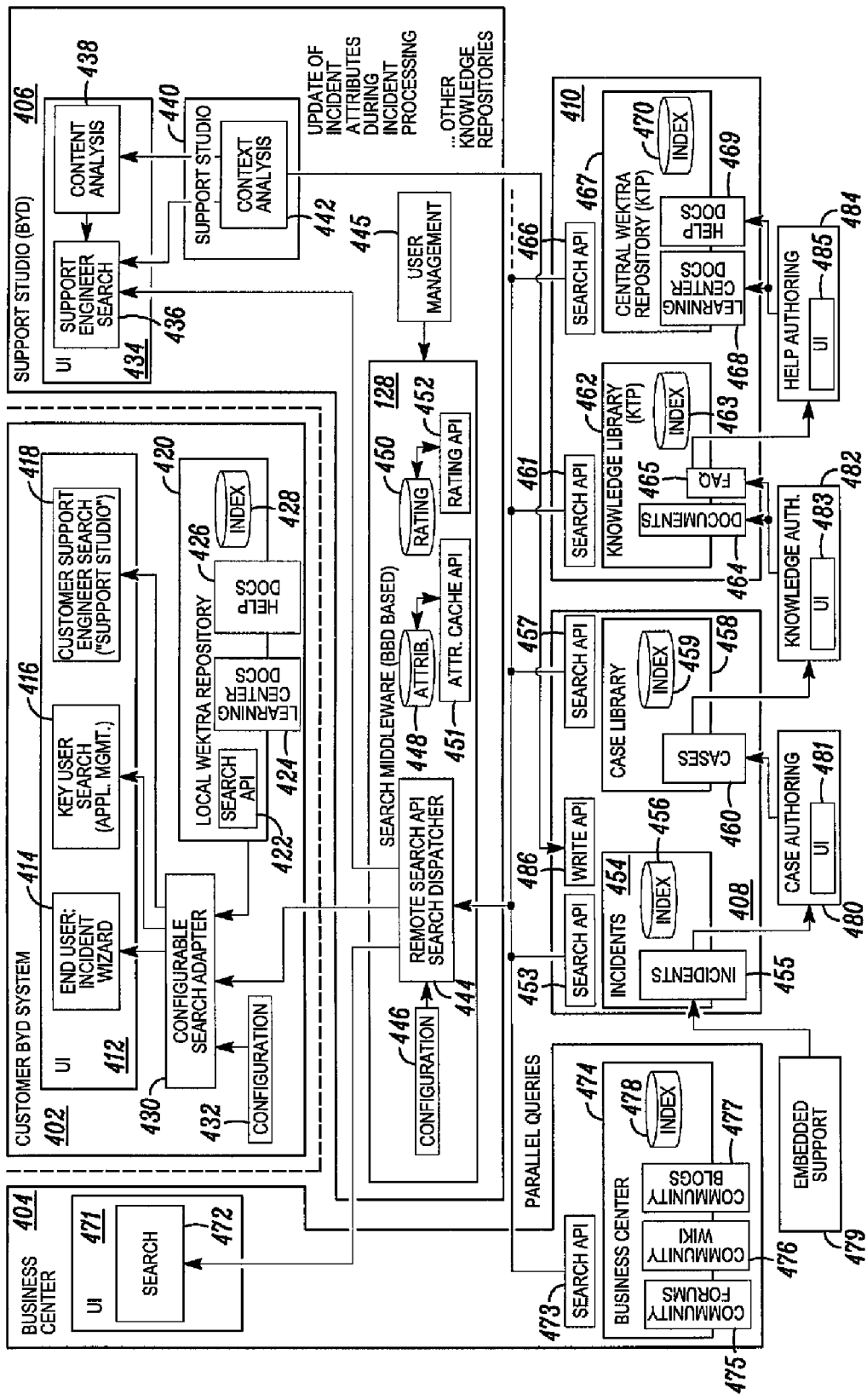
FIG. 4 is a block diagram of an example architecture for implementing the solution search techniques of FIGS. 1 and 3.

FIG. 4 is a block diagram 400 of an example architecture for implementing the solution search techniques of FIGS. 1 and 3. In FIG. 4, a customer system 402 may refer to a system that is located at, or accessible from, a customer location or site and that is used by a customer (e.g., purchasing entity) to assist in supporting functionality and operation of the software application 104 (e.g., a CRM system, not shown in FIG. 4).

Further in FIG. 4, a business center 404 refers generally to a set of resources associated with user interactions used in providing or determining solutions to incidents (e.g., by way of message boards or other user interactions). A support studio 406 is analogous to some or all of the support application 102 of FIG. 4, and, in particular, may include an implementation of the solution search middleware 128, as shown.

Solution search sources may include multiple sources or repositories, as described herein. Generally, a first solution source 408 and a second solution source 410 may be used (e.g., analogous to solution sources 308a, 308b of FIG. 1). As shown, the first solution source 408 may include current or past incidents that may be related, as well as cases that are created based on successful completion or handling of a given solution search. For example, if ten incidents were processed for solutions by the search middleware 128, and five of these resulted in successful disposition of (solution to) the corresponding incident, then it may be helpful for future incidents to identify some or all of the five successfully-resolved incidents and provide one or more corresponding cases or descriptions of the incidents for later use in resolving similar incidents. In a similar way, for example, a subset of the cases may be important enough (e.g., may affect a large enough number of users) that the system 400 may be used to create a corresponding knowledge-based document(s) that may contain, e.g., a description of the incident and solution as well as attempts to find the solution and any other relevant information. These and other potential solution sources (e.g., repositories) are described in more detail herein.

At the customer system 402, a search UI is provided for use by appropriate personnel of the customer, e.g., a user of the application 104 or an appropriately-assigned support personnel (e.g., key user). Thus, an incident wizard 414 may be provided to the end user to research and potentially resolve the incident through a series of questions and answers aimed at identifying the source/resolution of the incident, while a separate UI may be used by a key user (e.g., IT support staff member of the customer). A customer support search 418 may be used by appropriate support personnel, e.g., an employee of the vendor of the application 104 with access to the support studio 406.

The customer system 402 may include a local repository 420 that may be associated with a search API 422 for searching, e.g., learning center documents 424 and help documents 426. An index 428 may be used (similarly to indices at 316a, 316b of FIG. 3) to search the available learning center/help documents 424, 426.

It may be appreciated from the above discussion that the customer system 413 different users may have different levels of security or otherwise may be restricted in their searches. A configurable search adaptor 430 may be included that is capable of determining which of the local or remote repositories or other solution search sources can or should be made available, depending at least in part on the identity of the requester. For example, an end user using the incident wizard may only have access to the learning center documents 424 and the help documents 426, but not to other, remote solution search sources 408, 410. Similarly, a key user may have access to some or all of the remote solution search sources, except may not have access to vendor-confidential information (such as information about other customers of the vendor). Configuration information 432 may be stored and accessed by the configurable search adaptor 430 in order to make the above and related determinations. Thus, it will be appreciated that the configurable search adaptor 430 is similar in concept to the search source manager 130 of FIGS. 1 and 3.

The support studio 406 may include a separate UI 434 for use only by vendor or vendor-authorized personnel, which provides a support engineer search UI 436 based on context analysis information 438 that is input from the support studio application 440 itself (analogous to the support application 102 of FIG. 1) including context analysis engine 442 (analogous to the context analyzer 108 of FIG. 1).

The support engineer search UI 436 thus provides a search including relevant attributes determined from the context analysis of the software incident in question, which may then be forwarded to the example implementation of the search middleware 128 shown in FIG. 4. Specifically, a remote search API (Search Dispatcher) 444 is shown that, analogous to the search dispatcher 134 of FIGS. 1 and 3, forwards the search to selected and appropriate solution search sources. In the example of FIG. 4, the search dispatcher 444 is illustrated as making the decision of which solution search sources will be included based on configuration information 446, as well as perhaps based on input from the configurable search adaptor 430 (and its associated configuration information 432). Thus, for example, the functionality of the solution search source 130 may be considered to be included within the search dispatcher 444 in some example embodiments, or may be considered to be distributed to include at least some operations of the configurable search adaptor 430.

Attributes 448 refer to the attributes maintained in common across the various solution search sources, while ratings 450 refer to the commonly-maintained rating or rankings of solution documents from the various solution search sources. An attribute cache API 451 reflects the possibility of caching attributes values and also inclusion of attribute metadata, such as naming techniques, categories of attributes, and other higher-level information about the attributes 448. Somewhat similarly, a rating API 452 implements the rating scheme for receiving rating or ranking information from the various users, associating the ratings with the appropriate documents, and retrieving the rating information when the document(s) are later used as part of a solution search. The search middleware 128 may be configured by user management tools 445 (e.g., select attribute cache characteristics, or select a new rating scheme, or update configuration 446 to further allow or restrict access to the various solution search sources). Further examples of attributes, attribute caching, and rating schemes are provided in detail below.

Solution search source 408 includes a search API 453 that is at least partially native to an incidents repository 454, which itself includes stored, previous incidents 455 as well as an indexing of the incidents using index 456 as described above. Analogously, a search API 457 exists for a case library 458 that includes an index 459 for stored case 460, while a search API 461 provides access to a knowledge library 462 that includes an index 463 of knowledge documents 464 and Frequently-Asked-Questions (FAQs) 465, and a search API 466 provides access to a central wektra repository 467 that stores learning center documents 468 and help documents 469 that are indexed with an index 470.

Other solution search sources also may be used, together with or in parallel with the search describe herein as performed by the search middleware 128. For example, the business center 404 may include a UI 471 with a search interface 472. A search API 473 associated with a business center solution source 474 may include community forums 475, community wiki projects 476, and community blogs 477, some or all of which may be associated with an index 478. Such community-based solution search sources may provide a dynamic and fluid resource for determining incident solutions, based in part on experiences of current and past end users.

In the example of FIG. 4, at least two general types of attributes may be used and referenced. In particular, software attributes may include SOA/platform attributes of the software (e.g., software application 104) that may describe, for example, where in the software the incident occurred, the possible cause of the incident, and a version of the software. Additional examples are provided below. A second type of attributes are organizational attributes that are more related to solution documents within the various solution sources/repositories, including, e.g., the organizational process of incident processing and knowledge document processing, as well as information regarding author, creation date, status, and other document-related information.

At least in the communication between consumer search UIs (e.g., 414, 416, 418, 436), search middleware (128) and solution sources/repositories (408, 410) common attribute names and values are used, although, internally, each solution repository may do a mapping to internal names and values.

With reference to software attributes referenced above, at least two (sub) types of attributes may be used, e.g., identifiers/codes and text attributes. For example, identifier attributes may be used to identify an object of an application platform uniquely, and may be used technically and mainly for machine interaction. Identifiers may be stored in knowledge repositories as attributes and can be used for an attributed search and guided navigation, as described herein. In example implementations, identifiers may have a namespace(s), so that only the combination of identifier/code and the namespace is unique. When executing a search, then, a unique combination identifier/code may be used as a combined attribute, or a unique attribute with a defined length may be created.

A software object used by the software application 104 may be identified by different identifiers (e.g., a business object may be identified by an ESI name: (e.g. SAPSupportRequest) and an ABAP name (e.g. SAP_SUPPORT_REQUEST)). However, in the example of FIG. 4, a single object identifier may be used and, if necessary, the search middleware 128 may provide appropriate mappings. Identifiers may be derived from other identifiers (e.g. a main work center can be derived from a delta link work center). If necessary, the search middleware 128 may provide mappings for such derivations.

In the following examples the following naming convention is used: for an identifier, the convention is <ObjectName>ID, such as WorkCenterID; for a namespace, the convention is <ObjectName>NameSpace, such as WorkCenterNameSpace; and for an alternative identifier, the convention is <ObjectName><AlternativeDescription>ID, such as WorkCenterHelpID.

In addition to identifier/code software attributes, there may be text attributes related to the software, which are used to describe objects in different (natural and business) languages. For one object there is only one (main) identifier for a solution search. However, there may be several text attributes describing the object.

For example, text attributes of a "Business Object" having BusinessObjectID "SupportRequest," may include a BusinessObjectName of "Support Request," a BusinessObjectTranslatedName may be "Supportanfrage" (for a German translation), a BusinessObjectAlternativeBusinessTerm (used, e.g., on the solution search UI) of "Incident," and a BusinessObjectTranslatedBusinessTerm (used, e.g., on the solution search UI when presented in German) "Vorfall."

Then, in the example of FIG. 4, text attributes may be stored as attributes with documents within the solution sources 408, 410, and may be used as additional key words in the free text area of the document(s) and are loaded into the respective indices 456, 459, 463, and 470 to be used for a free text search in addition to the attribute-based search(es) as described herein.

A naming convention for the text attributes may include, for a name, <ObjectName>Name, such as BusinessObjectName; for a translated name, <ObjectName>TranslatedName, such as BusinessObject- TranslatedName; for an alternative business term, <ObjectName>AlternativeBusinessTerm, such as BusinessObjectAlternativeBusinessTerm; and for a translated alternative business term, <ObjectName>TranslatedAlternativeBusinessTerm, such as BusinessObjectTranslatedAlternativeBusinessTerm.

For example, if a user enters the German term "Vorfall" in a free text search, then in the search result, the user will get (among others) all knowledge documents with (from the above examples) BusinessObjectName: Support Request. This may include many results. In some example implementations, a guided navigation tree may be offered that offers the differentiation between documents on the Support Request and other documents, such as when the term "Vorfall" is used in Logistics or some other department/area.

Table 1 below shows an example of an attribute object that may be implemented in the example of FIG. 4 and using the above features, values, and naming conventions.

(e.g., 310a, 310b) must map their internal schemas against the commonly used schema. For example, a common code schema for PriorityCode may be used of: 1: Very high, 2: High, 3: Medium, 4: Low. Also, the following common code schema for StatusCode may be used of 1: New/in process, 2: Active/released internally, 3: Active/released for customers, 4: Outdated/archived.

In further specific examples of the architecture of FIG. 4, the attribute cache 451 may be used in example implementations to provide information on attribute metadata and values for use by the different components of the search infrastructure (e.g., the support studio 406, or knowledge library 462, among others). The attribute cache 451 may be useful, e.g., if the original data on the attributes are distributed in different repositories. The attribute cache 451 may be used to provide value help from a performance standpoint. For example, the attribute cache may buffer attributes that would have to otherwise be read remotely. The attribute cache 451 also may

TABLE 1

| Structure | | Name |
|---|---|---|
| SoftwareEntity | | SoftwareEntity (new) |
|   SoftwareEntityCode | | SoftwareEntityCode |
|   SearchID | | Idenitifier |
|   ID | | Idenitifier |
|   NameSpace | | NamespaceURI |
|   AlternativeID | | Idenitifier |
| | @code | Code |
|   Name | | LANGUAGEINDEPENDENT_EXTENDED_Name |
|   NameSpace | | NamespaceURI |
|   TranslatedName | | EXTENDED_Name |
| | @languageCode | LanguageCode |
|   AlternativeBusinessTerm | | LANGUAGEINDEPENDENT_EXTENDED_Name |
|   TranslatedAlternativeBusinessTerm | | EXTENDED_Name |
| | @languageCode | LanguageCode |
|   SoftwareEntityType | | SoftwareEntityType |

As referenced above, organizational, document-based attributes may include attributes that describe the organizational process of incident processing and knowledge document processing, such as, for example, an author, creation date, status, or other related information.

For example, three types of such attributes may include dates, names, and codes. Of course, additional or alternative examples also may be implemented.

Regarding dates, the following date attributes may be used for a search. For example, a CreationDate may refer to a date when a document (e.g., incident, or knowledge document) has been created. LastChangeDate may be a date attribute that refers to a date when a document was changed the last time. Other date examples may be implemented as well.

Regarding the name attribute, the following name attributes may be used for a search. For example, the name attribute ResponsiblePersonName may refer to a name of the responsible person for the document, e.g., the author or the processor. LastChangedName may be a name attribute that refers to the name of the person who did the last content change in the document.

Regarding code attributes, the following code attributes may be used for a search. For example, the code attribute PriorityCode may refer to a priority of a document, while a code attribute StatusCode may refer to a status of a document.

For codes used in the solution search(es) described herein, an agreement on a common code schema across all knowledge repositories may be implemented for every code. Internally the knowledge repository can use different schemas, but for search purpose, then, e.g., the repository search interfaces handle filtering or sequential value scrolling for attributes which have many values, and thus can not all be displayed at once. In example implementations, the attribute cache may have one or more APIs to obtain the attributes and/or attribute values, which may be realized, e.g., as Web Service(s) and/or RFC(s). Such buffering may be done in the database, and/or, for attributes with many values in a shared memory area.

For example, the attribute cache may hold the metadata for the search attributes. Meta data may include, for example, data that describe how attributes are used in the search infrastructure centrally (e.g., naming, or information about who uses which attribute). The metadata of the attributes may be maintained in the search middleware 128 directly or accessed from another location, e.g., from the support studio 440.

Further, the attribute cache 451 may hold the values of the different attributes. The attribute cache 451 may be used to retrieve the values from the different repositories and make them available to the different components of the search infrastructure of FIG. 4. For example, the attribute cache 451 may be used to convert free text from a free text search into structured attributes for use in searching as described herein.

In more specific examples, the attribute cache 451 may be used in creation of knowledge documents 464. As described herein, these knowledge documents 464 may be based on cases 460. In this example, then, the attribute cache 451 may be used (e.g., in association with the attribute manager 132) to verify and provide search attributes from the source case, check which of the attributes are mandatory to include in the knowledge document creation process, search for additional attributes that may be assigned during the authoring process, and fill the (translated) descriptions of the attribute as additional key words for free text search.

The attribute cache 451 may be implemented in a way that metadata and value of the attributes are stored in the main memory as well as in the corresponding database. If the search middleware 128 is stopped, the data may thus reside still in the database and be loaded into the main memory after the restart on first access. If the support studio 440 is upgraded or otherwise migrated, then migration support may be provided for the meta data but not for the attribute values. The values may then be reloaded again as needed.

As described above, the search middleware 128 may provide a rating manager 136 along with ratings 306/450 and corresponding API 452 that effectively provide(s) a rating database that keeps track of the usage of the searched documents. For example, it may track for each document, a number of hits (e.g., how often the document is found by the different search clients), as well as positive/negative votes (e.g., how often did this document help). The counting of hits may be provided as an automatic function of the search middleware, which may, e.g., save the hits with every search.

As shown and described, the search middleware 128 may provide a write API 486 that may be used to set a rating that can be implemented by search clients. The input of such an API may include a rating table that includes a document key, a document type code (e.g., 01 for incident, or 02 for cases), and a vote type code (i.e., a coded representation of a voting for the document, such as a number of stars or a numeric rating where each selectable number corresponds with a positive or negative rating of varying degree(s). The output may thus include a return rating code and associated return text As referenced above, in order to help ensure that the attributes are maintained in an appropriate way, e.g., consistently across the various solution search sources, an appropriate authoring process may be used. For example, during the processing of incidents, proposals for attributes may be calculated by the Context Analysis 442 of the Support Studio 440, as shown as being provided to the incidents 455 by way of embedded support 479. These calculated attributes may be stored with the incident when the support employee closes the Support Studio. The support employee may maintain the pre-calculated attributes.

During the creation of subsequent documents, the attributes of the incident may be used as attributes for the subsequent document. For example, case authoring 480 may use a UI 481 to author new cases 460 from the incidents 454. Similarly, knowledge authoring 482 may use a UI 483 to author new knowledge documents 464 or FAQ documents 465 from the cases 460. Finally in the example of FIG. 4, help authoring 484 may use a UI 485 to author new learning center documents 468 and/or help documents 469 from the knowledge documents 462. The support employee may maintain the attributes during the authoring process.

The attributes may be stored with the documents and used for the search. Additional examples for attributes include "category" (e.g., a category of incident such as 'missing functionality'), "application" (e.g., customer resource management), and availability (e.g., degree of availability). Attributes may be classified as, e.g., mandatory, optional, or not relevant. The attribute "category" of a document may be used to determine which attributes are mandatory, optional or not relevant for a particular document. If the incident is created using the incident wizard 414, the category of an incident may be determined and stored in the context provider (e.g., context provider 113a of FIG. 1) of the incident wizard 414.

The setting and authoring of attributes may be done as described herein. Specifically, for example, attributes at the incident may first be set during the incident creation process of the embedded support 479, which is similar to embedded support 106 of FIG. 1 (including more elementary elements) and then later by the context analysis 442 (including more sophisticated attributes like business object, or relevant error message,). These calculated attributes may be stored with the incident in the incidents 455.

When a "case" is created for the cases 460, based on an incident, the attributes are taken over from the incident and the creator (using UI 481) can decide which attributes she or he will take over as proposed and which ones are modified manually. Similarly, when a knowledge base article is created using the UI 483, the attribute may be taken over from the "case" document and the creator can decide which attributes she or he will take over as proposed and which ones are modified manually.

Figure 5:
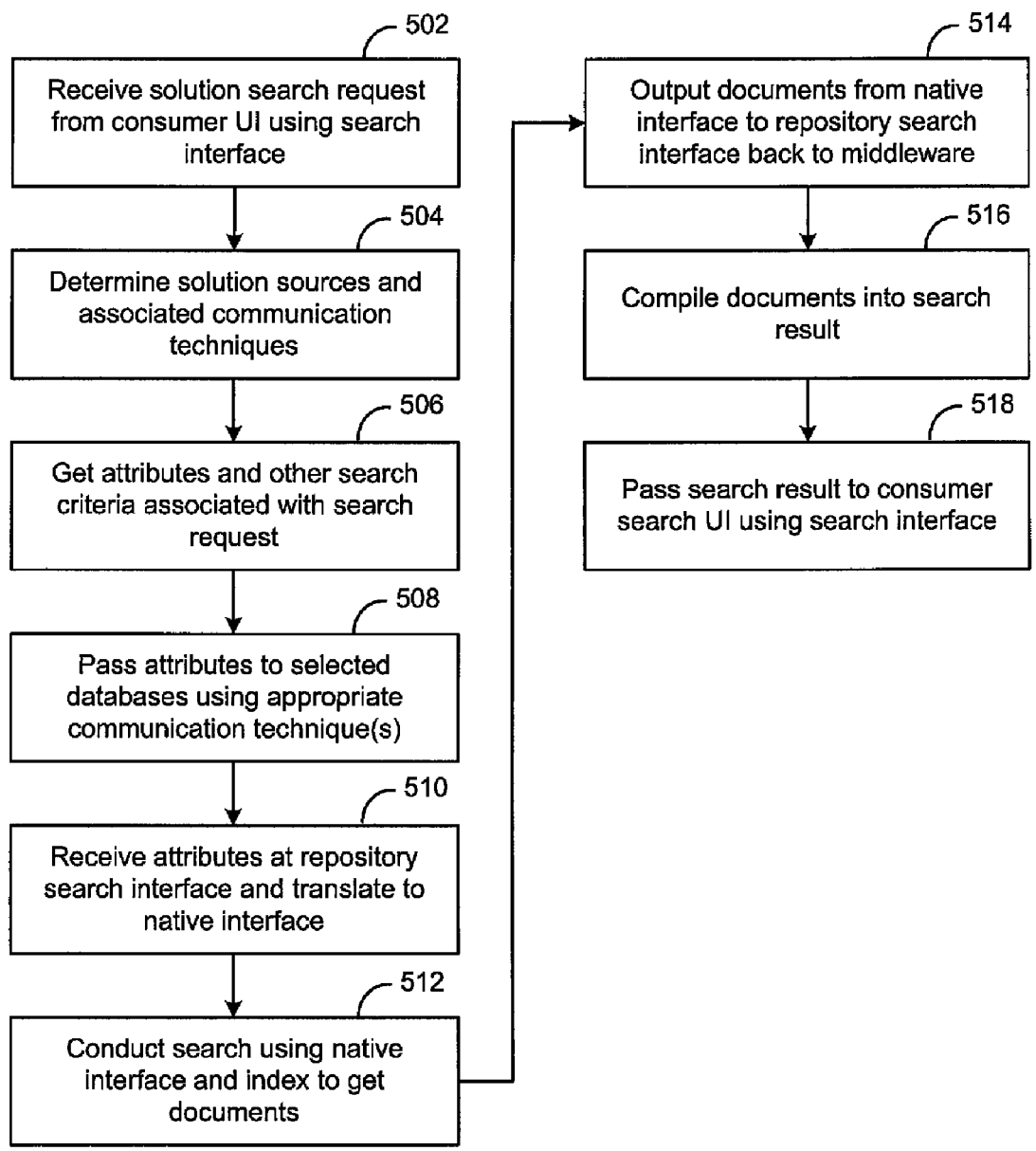
FIG. 5 is a flowchart illustrating example operations of the systems of FIGS. 1, 3, and 4.

FIG. 5 is a flowchart 500 illustrating example operations of the systems of FIGS. 1, 3, and 4. That is, FIGS. 1, 3, and 4 illustrate example systems and architectures that may be used, and FIG. 5 illustrates example methods and operations that may be implemented using these systems/architectures, or subsets or combinations thereof, as well as possibly other system elements not specifically illustrated.

In the example of FIG. 5, a solution search request may be received from a consumer UI using a search interface of the search middleware (502). For example, the consumer search UIs 126a, 126b, 414, 416, 418, 436, or 472 may be used to submit a search request for a solution to a software incident that has occurred. As described herein, the search request may include a number of search attributes and other parameters, some or all of which may have been obtained (perhaps automatically) from the context information associated with the incident in question, such as a software version, a relevant error message, or other information obtained by the context providers 113a-113d of the embedded support system 106. As described, a common search interface 302 of the search middleware 128 may be used that is accessible to and compatible with, all of the various consumer search UIs.

Solution sources and associated communication techniques may then be determined for executing the solution search (504). For example, the solution search source manager 130 may consider the relevant consumer search UI which was the source of the search request, as well as an identity or role of the user of the consumer search UI, as well as a nature of the search request (e.g., included attributes). Then, based on this information and perhaps other information from the configuration information 446, the search middleware 128 may select from among the various available solution search sources.

Determining the solution sources and communication techniques may include locating the desired search solution source(s). For example, when the appropriate communication technique includes a web service(s) for communicating with a solution repository, a directory such as a UDDI (Universal Description, Discovery, and Integration) may be consulted, along with a corresponding WSDL (Web Services Description Language) used as part of a RPC (Remote Procedure Call), to find and access a relevant Web Service address. In other examples, the communication technique may include a RFC (Remote Function Call) (and associated RFC connection) that is used, for example, when the relevant solution search source include an ABAP-based system/memory.

Attributes and other search criteria (e.g., free text) associated with search request may be obtained (506), either before, during, or after the selection of the appropriate solution search sources. For example, the search dispatcher 444 of FIG. 4 may consult the attribute cache API 451 to determine relevant attribute values or metadata, e.g., to determine whether an attribute should or must be included in (or exclude from) the search, and to determine available or possible values within one or more of the possible solution search sources.

Attributes may be transmitted to selected databases using appropriate communication technique(s) (508). For example, the search dispatcher 444 may be configured to send a first search request to the incidents source 454 on an ABAP platform using a RFC, and configured to send a second search request to the knowledge library 462 on a Java platform using a RPC for a web service.

Attributes may be received at a repository search interface(s) and translate to native interface (510). For example, the search request may be received at the repository search interfaces 310*a,* 310*b* and translated for native interfaces 312*a,* 312*b* in FIG. 3, or may be received and translated at the search API(s) 453, 457, 461, 466 (which may, for example, include both the repository search interface(s) and native interface(s) even though not shown explicitly in that figure).

Search(es) may be conducted using the respective native interface and index to retrieve appropriate documents (512). For example, as described, the transmitted attributes and associated values may be determined from the respective index and then used to retrieve documents having (or associated with) those attributes from the various repositories.

Resulting documents may then be output from the respective native interface to the repository search interface, and from there back to the search middleware 128 (514). For example, to the extent necessary, a reverse translation between the native interface(s) and the repository search interface(s) may be executed in order to complete the transmission back to the search middleware 128 in a manner that is compatible with the search middleware 128.

Documents may then be compiled into a search result (516). For example, the search results aggregator 138 may be configured to compile the documents from the various solution sources. For example, such documents may arrive over a short or long period of time, or a search may have to be wholly or partially re-executed (e.g., due to network or other connectivity difficulties, or due to malfunction of the solution search source in question). In such cases, the search results aggregator 138 may maintain the current search results in memory until the entire set of documents is ready, or may output the currently-available documents, perhaps with a notification regarding the unavailable solution source.

Search result(s) may be passed to the requesting consumer search UI, e.g., using the search interface 302 (518). Again, the search interface 302 may be common to all available consumer search UIs. Examples of consumer search UI(s) and related solution UI(s) are provided below with respect to FIGS. 6-8.

As just described, a search process(es) may be executed using attributes and associated attribute values and attribute metadata. In additional or alternative implementations, a free text search may be executed as well.

Thus, in a more specific example, the support studio UI 436 may be used to execute such a search(es). In particular, when a user navigates to the UI 436, the context analysis 442 is started and returns a list of attributes/values that are relevant for the search, such as, for example, objects like work center, UI, business objects, agents, process components, or error messages. Some of these attributes/values are classified as "relevant for core search" and thus are automatically pre-filled into the first search. The rest of the retrieved attributes/values may be classified as "relevant for extended search" and may be used later for manual search(es) run by the user.

For example, the context analysis 442 may determine the attributes category="Error message on screen" and Work Center="Sales Orders" as attributes/values classified as "relevant for core search". Among many others, the context analysis 442 may determine the attributes/values Business Object="Sales Order", Business Object="Material", Business Object="Customer", . . . , Agent="Maintain Accounting Document from Sales", Error message="UI:T100: SAL01: 005:&1:&2 was not maintained", as attributes "relevant for extended search".

Then, during a first search ("core search") run, the search engines may return a list of solution documents and a guided (dynamic) navigation tree. The attributes in the guided navigation tree may be displayed in the UI 436 and used for refinement of the search. Attributes which are found in the guided navigation and in the incident as well, may be highlighted or otherwise designated in the UI 436.

For example, a "core search" with attributes category="Error message on screen" and Work Center="Sales Orders" may return 100 hits, and the guided navigation tree may identify the attributes Agent="Maintain Accounting Document from Sales" and Error message="UI: T100: SAL01:005:&1:&2 was not maintained", as relevant for 3 hits. In this case the search is refined with the 4 attribute value pairs and the result may be displayed. Subsequently, in the manual search process, the list of attribute/value pairs marked as "relevant for core search" or as "relevant for extended search" may be used to form the value help from which a user can select to be included or excluded from the search.

Figure 6:
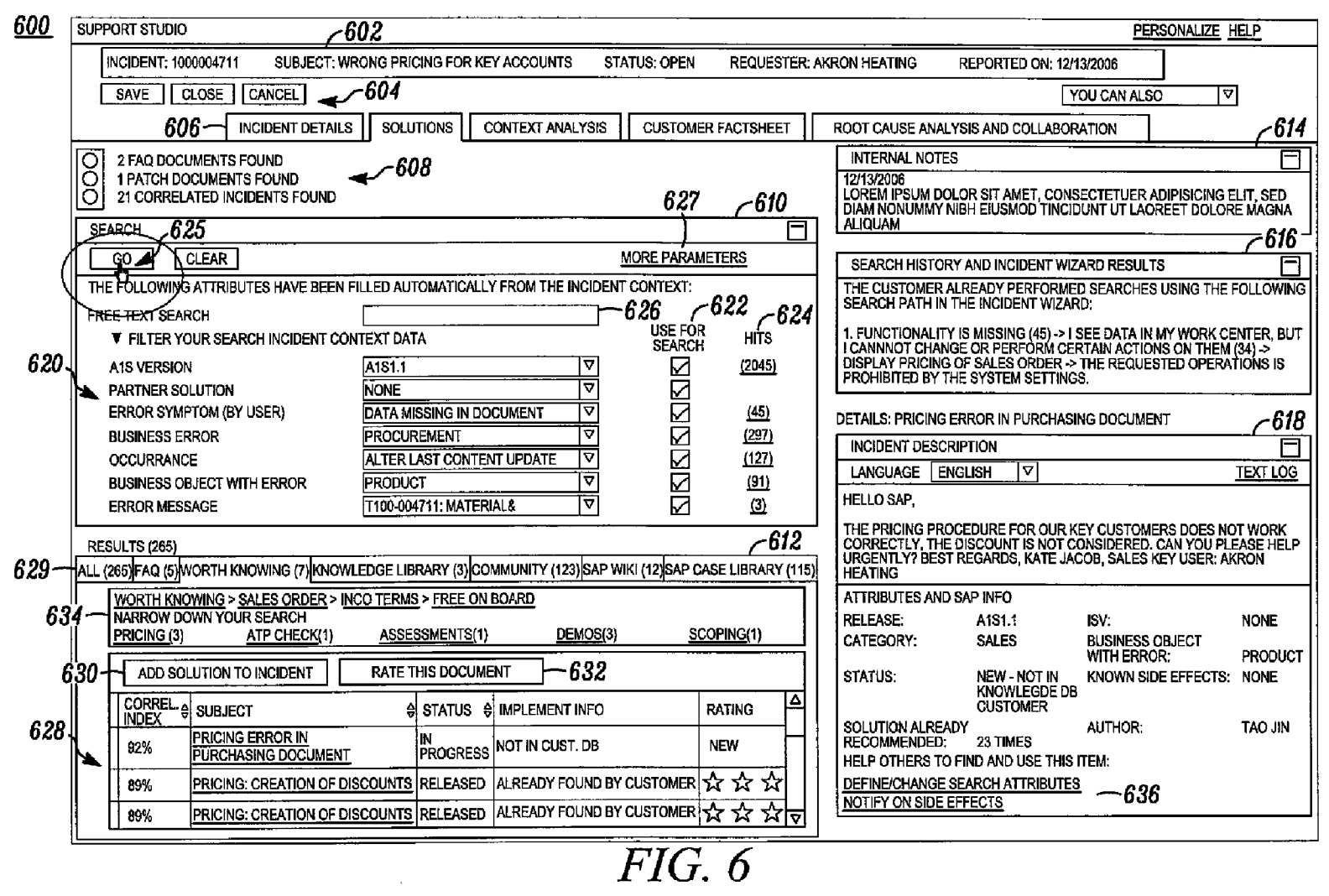

FIG. 6 is a first screenshot 600 of an example solution-related UI (e.g., the UI 436) that may be used in the systems of FIGS. 1, 3, and 4. In the example of FIG. 6, an identification bar 602 is included that identifies the incident in question, a subject and status of the incident, an identity of the party requesting a solution, and a date of reporting of the incident. Buttons 604 allow a user to save, close, or cancel an operation of the UI 602. Tabs 606 represent different screens of the UI, including a tab for incident details, the solution tab (selected in FIG. 6), a context analysis tab, a customer factsheet tab, and a root cause analysis and collaboration tab. A status section 608 illustrates a list of returned solution documents (e.g., 2 FAQ documents, a software patch document, and 21 correlated incidents).

A search parameters sub-view 610 shows a (dynamic) list of search attributes together with information regarding the attributes and their use in the search(es). A results window 612 illustrates search results and information about the search results. A sub-view 614 for internal notes allows the support personnel to record information useful to processing the incident. A search history and incident wizard sub-view 616 provides information on previous searches, including searches performed by the end user using the incident wizard 414. In a final sub-view 618, details regarding the incident description are provided/recorded.

In the search parameters sub-view 610, attributes are filled into section 620 of selectable attribute values, many or all of which may be filled in automatically using context analysis 442. These attributes are to be used for the particular search to be run, and a section 622 of selectable checkboxes are provided to allow the user to indicate whether the corresponding attribute should be included. A 'hits' section 624 is included to illustrate how many result/solution documents would be returned if a search were run using only the corresponding attribute. Finally in section 620, a line 626 is included to allow the user to provide free text search words, to be used in addition to the attribute-based search.

Thus, with the sub-view 610, attributes may be included or excluded from the search. Attribute values may be changed, including the selection of multiple attributes. Attributes may be added manually to the search parameter list, and the search may be initiated with a "Go" button 625. A link 627 for 'more parameters' may be included for adding attributes to the solution search attributes list. Attribute values from the incident context may be added, or the link 627 may be used to open a supplemental screen/UI in order to add values which are not in the context.

In the solution results sub-view 612, a table 628 is included that provides results including a correlation index (indicating a percentage match between the search request characteristics and the corresponding solution document(s)), an identification of, and link to, the actual solution documents, a status of the document (e.g., released), an indication of whether the customer has already located the corresponding document(s), and a rating of the document relative to its ability to assist in resolving the incident(s) in question. The table 628 may be selected from a row 629 of possible solution sources (e.g., "All," "FAQ," "worth knowing," "knowledge library," "community," "wiki," and "case library," each of which, as shown, may include an indication of a number of documents found therein).

A button 630 allows the user to add a selected solution to the incident in question, while a button 632 allows the user to provide his or her own rating to a selected document (e.g., using configurable codes such as "Document was helpful", "Document was successfully implemented", "Document was not helpful", "Document contains errors" or "Document is not understandable"). A view 634 provides an example of the guided navigation tree referenced above, by providing attributes/values that the user may select to narrow down the search results. In example implementations, the list within the table 628 is sorted by the correlation index. The user can sort it by the other columns. In example operations, a solution document may be selected, or opened in a separate window.

In the search history and incident wizard results sub-view 616, as referenced above, the results of previous search runs may be shown. If the customer has used the Incident Wizard 414 to open the incident, the search runs of the Incident Wizard may be displayed under the following sentence: "The customer already performed searches using the following search path in the Incident Wizard:" If a support employee performed a search with the Support Studio on an incident before, the search runs of the previous searches may be displayed under the following sentence: "The Support Studio already performed searches using the following search path:" The number of search hits may be displayed with the search paths, and relevance information set by previous solution searches also may be included.

The preview pane 618 of the solution document shows selected details of the solution document selected in the search results list from the table 628. By default, and in the example, the preview pane 618 displays the first document in the list. In the example, a previous (similar) incident is illustrated with incident details and associated attributes/values. The user may then solve the incident based on this previous solution, or may start a workflow to change the attributes of the solution document to better suit the present incident, using link 636.

When the Support Studio 406 is closed or the user chooses the refine/define search attributes, a UI (not shown in FIG. 6) may be displayed in which the user may set the attributes of the present incident. This UI may be used to show a list for all attribute/value pairs found by the context analysis 442, and a column with information as to whether the attribute/value is attached to the incident (e.g., as a checkmark). If no attributes have been set before, checkmarks may be set for the attribute/values marked as "relevant for core search" and not set for attributes marked as "relevant for extended search". The user also may change the settings and save the attributes with the incident.

FIG. 7 is a second screenshot 700 of an example solution-related UI that may be used in the systems of FIGS. 1, 3, and 4. In the example of FIG. 7, information bar 702 provides details about a status of the "sales order quotation form" incident in question, including a status, ID, priority, reporting date, and requestor identity, as well as possible actions (e.g., save, cancel, preview, new (incident), or actions related to remote support).

In a section 704, results of the business user search in the Incident Wizard 414 may be shown, based on the question/answer pairs used with the incident wizard in section 706. In a section 708, a "Go" button is illustrated to start the search, along with a entry field for free text search.

Finally in FIG. 7, a table 710 named "Solution Collection" is shown which shows the solutions which are already assigned to the incident. The table 710 may be empty when the user opens the UI 700 the first time, and thereafter populated, e.g., from the Search Results UI described below with respect to FIG. 8.

FIG. 8 is a third screenshot 800 of an example solution-related UI that may be used in the systems of FIGS. 1, 3, and 4, and that may result from a selection of the Go button 708 in FIG. 7. In section 802, search parameters are shown, along with a section 804 for search results. A section 806 provides a table "Solution Collection" that holds the solutions which are assigned from the search results lists 804. The table 806 may allow the users to select a subset of the search results list 804, and selected solutions may be assigned to the incident when the Search Results window 800 is closed.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
 a search middleware configured to receive a search request for a solution to a software incident from at least one consumer search user interface (UI), via a search interface, and to conduct a search of at least two solution repositories of a plurality of solution repositories for a possible solution to the incident, based on the search request, and further configured to return a combined solution search result to the consumer UI,
 wherein each of the plurality of solution repositories contains documents of a solution type and is associated with
  an index configured to store attributes associated with at least some of the documents, and to store at least one attribute value associated with each attribute;
  a native search interface configured to search the index based on the attributes and thereby obtain at least some of the documents containing at least one of the attributes and attribute value, and
  a repository search interface configured to map the search request between the search interface and the native search interface, including mapping at least one attribute or attribute value specified by the search request into a format for searching using the index,
 wherein the search middleware includes
  a search source manager configured to select the at least two solution repositories from the plurality of solution repositories, based on the search request,
  an attribute manager configured to associate the attributes commonly between each of the plurality of repositories, and to associate these attributes with the index of each repository;
  a search dispatcher configured to receive the search request expressed using the attributes and provide the search request to repository interfaces of the at least two solution repositories for translation for input to respective native interfaces thereof for conducting a search for the attributes using the indices of each of the at least two repositories to obtain the documents, and to receive the search result from each repository, and
  a search compiler configured to receive the documents and compile the documents into the solution search result for providing to the consumer search UI including an identification of a source solution repository of each document in the search result.

2. The system of claim 1 wherein the search middleware includes an attribute cache configured to manage attribute metadata regarding the attributes and to cache at least some of the attribute values as stored in the at least two solution repositories of the plurality of solution repositories.

3. The system of claim 1 wherein the attributes include software attributes characterizing and identifying software in which the software incident occurred.

4. The system of claim 1 wherein the attributes include document attributes characterizing at least some of the documents in the plurality of solution repositories.

5. The system of claim 1 wherein search dispatcher is configured to determine at least some of the attributes included in the search request, based on context information associated with the software incident and collected with the reporting of the software incident.

6. The system of claim 1 wherein the repository search interface includes a web service.

7. The system of claim 1 wherein the search dispatcher is configured to access the repository search interface using a remote function call.

8. The system of claim 1 wherein the search source manager is configured to select the at least two solution repositories based on a user of the consumer search UI and on the consumer search UI.

9. The system of claim 1 wherein the search interface of the search middleware is compatible with at least two consumer search UIs.

10. The system of claim 1 wherein the search middleware includes a rating manager configured to associate a user-received rating of each of the search result documents for inclusion with the search results by the search compiler.

11. The system of claim 1 wherein the documents of a solution type include one or more of incident documents based on previous software incidents, case documents based on a subset of the previous software incidents and describing the subset along with previous solutions thereto, and knowledgebase documents based on the case documents and describing categories of software incidents.

12. A search middleware for providing solutions for software incidents, the search middleware comprising:

a search interface configured to receive a solution search request from at least one consumer search user interface (UI), the solution search request referencing a software incident of a software application and including context data collected about the software application at the time of the software incident;

a solution source manager configured to receive the solution search request and select at least two solution repositories from among a plurality of solution repositories, and based on the consumer search UI, and further configured to determine corresponding communication techniques for communicating with the at least two solution repositories;

an attribute manager configured to determine attribute values based on the context data, the attribute values selected from a plurality of attributes and attribute values that are maintained in common for the plurality of solution repositories by the attribute manager;

a search dispatcher configured to dispatch the search request to the at least two solution repositories, including the attribute values and using the corresponding communications techniques;

at least one index associated with the at least two solution repositories and configured to index documents within the at least two solution repositories based on the attributes and attribute values;

a repository search interface associated with each of the at least two solution repositories and configured to translate the search request for input to a native interface for a search of the at least two solution repositories using the at least one index to retrieve solution documents; and a search compiler configured to receive the solution documents and compile the documents into a solution search result for providing to the at least one consumer search UI including an identification of a source solution repository of each solution document in the solution search result.

13. The system of claim 12 comprising an attribute cache configured to manage attribute metadata regarding the attributes and to cache at least some of the attribute values as stored in the at least two solution repositories of the plurality of solution repositories.

14. The system of claim 12 wherein the attributes include software attributes characterizing and identifying software in which the software incident occurred.

15. The system of claim 12 wherein the attributes include documents attributes characterizing at least some of the documents in the plurality of solution repositories.

16. The system of claim 12 comprising a rating manager configured to associate a user-received rating of each of the search result documents for inclusion with the solution search results compiled by the search compiler.

17. A method comprising:

receiving a solution search request from at least one consumer search user interface (UI), the solution search request referencing a software incident of a software application and including context data collected about the software application at the time of the software incident;

selecting at least two solution repositories from among a plurality of solution repositories, and based on the consumer search UI;

determining corresponding communication techniques for communicating with the at least two solution repositories;

determining attribute values based on the context data, the attribute values selected from a plurality of attributes and attribute values that are maintained in common for the plurality of solution repositories;

dispatching the search request to the at least two solution repositories, including the attribute values and using the corresponding communications techniques;

translating the search request for input to a native interface for a search of the at least two solution repositories using at least one index to retrieve solution documents, the at least one index associated with the at least two solution repositories and configured to index documents within the at least two solution repositories based on the attributes and attribute values; and compiling the solution documents into a solution search result for providing to the at least one consumer search UI, including an identification of a source solution repository of each solution document in the solution search result.

18. The method of claim 17 wherein compiling the solution documents into a solution search result comprises:

associating a user-received rating of each of the search result documents for inclusion with the solution search results compiled by the search compiler.

19. The method of claim 17 wherein the attributes include software attributes characterizing and identifying software in which the software incident occurred.

20. The method of claim 17 wherein the attributes include document attributes characterizing at least some of the documents in the plurality of solution repositories.

* * * * *